United States Patent [19]

Arkens et al.

[11] Patent Number: 5,182,179
[45] Date of Patent: Jan. 26, 1993

[54] FIBER BINDER

[75] Inventor: Charles T. Arkens, Hatfield, Reginald T. Smart, Horsham, both of PA.

[73] Assignee: Rohm and Haas Company, Philadelphia, Pa.

[21] Appl. No.: 624,178

[22] Filed: Dec. 7, 1990

[51] Int. Cl.$^5$ ............................................. H01M 2/16
[52] U.S. Cl. ..................................... 429/254; 429/249
[58] Field of Search ................ 428/288, 375; 429/254, 429/249

[56] References Cited

U.S. PATENT DOCUMENTS

| | | | |
|---|---|---|---|
| 3,676,404 | 7/1972 | Nield | 525/205 |
| 3,745,196 | 7/1973 | Lane et al. | 525/292 |
| 4,107,120 | 8/1978 | Plamondon et al. | 523/201 |
| 4,181,769 | 1/1980 | Plamondon et al. | 428/253 |
| 4,277,384 | 7/1981 | Arkens | 524/460 |
| 4,351,875 | 9/1982 | Arkens | 428/290 |
| 4,363,856 | 12/1982 | Waterhouse . | |
| 4,529,677 | 7/1985 | Bodendorf . | |
| 5,004,777 | 4/1991 | Abbenton et al. | 524/433 |

Primary Examiner—Asok Pal
Assistant Examiner—C. Everhart

[57] ABSTRACT

This invention relates to improved textile fibers having deposited thereon a coagulable, multi-stage, latex binder. In addition, this invention relates to a method for improving the stiffness of textile materials by depositing thereon an acid-resistant, coagulable, multi-stage, latex binder wherein one stage enhances the stiffness of the textile fibers and another stage controls the coagulation temperature of the latex binder. The latex binder is particularly suitable for use in battery separators.

6 Claims, No Drawings

FIBER BINDER

FIELD OF THE INVENTION

This invention relates to improved textile fibers having deposited thereon an acid-resistant, coagulable, multi-stage, latex binder. In addition, this invention relates to a method for improving the stiffness of textile materials by depositing thereon an acid-resistant, coagulable, multi-stage, latex binder wherein one stage enhances the stiffness of the textile fibers and another stage controls the coagulation temperature of the latex binder. The latex binder is particularly suitable for use in battery separators.

BACKGROUND OF THE INVENTION

Although a great variety of latices have been developed which are useful as finish coats, binders, adhesives, back-coatings, transfer films and interlayers for a wide variety of textile applications, there lacks a latex which, alone or in cooperation with other materials used in textiles:
 (1) improves the stiffness of the textile material under elevated temperatures and high relative humidity;
 (2) is acid resistant; and
 (3) is coagulable under specified temperature conditions.
These properties are essential for the polymers used in battery separators.

Battery separators are thin, porous webs which are impregnated with a latex binder and passed through drying ovens to remove the water. In a battery cell, closely spaced metal electrode plates are connected in series and are immersed in a highly acidic, electrolytic solution. The battery separators are placed between the metal electrode plates to prevent the metal electrode plates from contacting each other and to prevent metal salts or other conductive materials from forming bridges between the metal electrode plates. Both of these problems would ultimately short circuit the cell. The battery separator must remain sufficiently porous to allow the free flow of electrolyte solution between the metal electrode plates for effective ion exchange.

When the battery separators are inserted between closely spaced metal electrode plates, flexibility of the separator can cause problems by preventing the separator from being smoothly inserted between the metal electrode plates causing a disruption in the assembly operation. At elevated temperatures and at high relative humidity, the problem worsens.

Battery separators are manufactured commercially from a wide variety of fibers such as, for example, cellulose, glass, polyolefin, polyester and the like, fillers such as, for example, diatomaceous earth, different clays, silica, quartz, hydrocarbon polymer powders and the like, bound together with an organic binder supplied as a latex or aqueous dispersion. Battery separators made with conventional latex binders have a degree of stiffness which decreases as temperature and relative humidity increase. The decrease in stiffness causes manufacturing problems during assembly of the batteries.

A number of patents have addressed the need for improved battery separators. For example, U.S. Pat. No. 4,529,677 discloses a novel, improved, battery separator material particularly adaptable for use in maintenance-free batteries. The battery separator material includes a diatomaceous earth filler, an acrylate copolymer binder which includes a silane coupling agent attached to the polymeric backbone, and a combination of fibers comprising polyolefin, polyester and glass fibers. The acrylate copolymer binders contain about 80 weight %, or less preferably from about 80 weight % to about 30 weight % of a $C_1$ to $C_8$ alkyl acrylate monomer. The copolymer has a glass transition temperature of from about 30° C. to about 60° C. Furthermore, U.S. Pat. No. 4,363,856 discloses organic binders for battery separators. The binders are conventional, commercially available, film forming polymers based on monomers, such as methacrylic acid, acrylic acid, ethyl acrylate, methyl acrylate and the like which result in hydrophilic, flexible binders.

One approach to a stiffer battery separator has been to design one-stage, latex binders based on monomers which give a stiffer, more hydrophobic polymer. When this has been done by incorporating monomers such as, for example, styrene, alkyl substituted styrenes or isobornyl methacrylate in place of methyl methacrylate in a conventional latex used as a binder for battery separator plates, the complex factors controlling the coagulation temperature of the formulated latex binder on the nonwoven mat were disrupted and coagulation did not occur at the desired temperature from about 30° C. to about 60° C., the accepted coagulation temperature range in the industry, with temperatures from about 40° C. to about 45° C. preferred.

When the composition of the latex binder is adjusted to obtain a stiffer battery separator, the new composition may not coagulate within the desired temperature range. Battery separators are formed from fiber and fillers into a nonwoven mat which is then impregnated with a latex binder. The whole assembly is then dried at elevated temperatures to crosslink the latex binder and evaporate the water from the latex binder, thereby forming the battery separator. During the drying operation the latex binder tends to migrate to the surface of the battery separator as the water evaporates resulting in a nonuniform distribution of the latex binder. Therefore, to avoid this problem, latex binders are carefully formulated so that they are stable during impregnation of the nonwoven mat, but they coagulate uniformly throughout the nonwoven mat during oven drying at a low and narrow temperature range before any significant amount of water has evaporated. For latex binders currently in commercial use in battery separators, formulations have been developed wherein the binders coagulate at temperatures from about 30° C. to about 60° C., preferably from about 40° C. to about 45° C.

Multi-stage polymers have been employed for use on textiles to improve low temperature properties, such as flexibility. For example, U.S. Pat. No. 4,107,120 teaches latex compositions of a core/shell morphology and their use with textile materials to improve the low temperature properties thereof. U.S. Pat. No. 4,277,384 further improves upon that invention by providing latex compositions of a core/shell morphology and their use with textile materials which not only enhance the low temperature properties but also improve the flexibility and resistance to seam tearing of the textile materials. U.S. Pat. Nos. 4,181,769 and 4,351,875 disclose, respectively, the articles of manufacture of said core/shell compositions. None of these approaches, however, teach the use of a multi-stage latex binder composition wherein one stage enhances the stiffness of the textile fibers and another stage controls the coagulation temperature of the latex binder. This invention not only satisfies the need for stiffer textile materials under elevated temperatures and high relative humidity, especially in an acid environment, but also fulfills the need for a latex binder whose coagulation temperature may be controlled.

It is therefore an object of this invention to provide an improved textile fiber which contains an acid-resistant, coagulable, multi-stage latex binder.

It is a further object of this invention to provide a method for improving the stiffness of textile materials.

Other objects and advantages will become apparent from the following description and claims.

SUMMARY OF THE INVENTION

This invention provides an improved fiber material which contains an acid-resistant, coagulable, multi-stage, latex binder deposited onto textile fibers. The acid-resistant, coagulable, multi-stage, latex binder has a first stage copolymer which enhances the stiffness of the textile fibers and at least one other copolymer stage which controls the coagulation temperature of the latex binder. The latex binder is particularly suitable for use in battery separators.

DETAILED DESCRIPTION OF THE INVENTION

"Textile" as used herein refers to materials composed of natural or synthetic fibers, either woven or nonwoven, which are characterized by flexibility, fineness and a high ratio of length to thickness. "Latex" as used herein refers to a water-insoluble polymer which may be prepared by conventional polymerization techniques such as, for example, by emulsion polymerization. "Glass transition temperature," or "$T_g$," as used herein means the glass transition temperature of a polymer as calculated by the Fox equation [Bulletin of American Physics Society 1, 3, page 123 (1956)]:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers and $T_{g(1)}$ and $T_{g(2)}$ refer to the glass transition temperatures of the two corresponding homopolymers.

The latex binder compositions of this invention are multi-staged latex particles made up of at least two mutually incompatible copolymers. These mutually incompatible copolymers may be present in the following morphological configurations, for example, core/shell, core/shell particles with shell stages incompletely encapsulating the core, core/shell particles with a multiplicity of cores, interpenetrating network particles, and the like. In all of these cases the majority of the surface area of the particle will be occupied by at least one outer stage and the interior of the particle will be occupied by at least one inner stage.

The mutual incompatibility of two polymer compositions may be determined in various ways known in the art. For example, scanning electron microscopy using staining techniques to emphasize the difference between the appearance of the phases or stages is one such technique.

The multi-stage latex binder compositions of this invention shall be described as containing a "first stage" and a "second stage." The "second stage" as used herein does not mean to exclude the possibility that one or more polymers can be interposed between or formed on the first stage copolymer and before the second stage copolymer. The invention requires the first stage copolymer for its contribution to stiffness properties and one other copolymer (referred to herein as the "second stage") for controlled coagulation of the latex binder.

The "first stage" of the latex binder contains a copolymer which is hydrophobic, stable in an acidic environment and has a glass transition temperature of greater than about 80° C. in the dry state. A wide variety of first monomers or mixture of monomers can be used to make the copolymers of this stage such as, for example, methyl methacrylate, cyclohexyl methacrylate, benzyl methacrylate, phenyl methacrylate, isobornyl methacrylate, styrene, 3-methyl styrene, 4-methyl styrene, 4-t-butyl styrene, 2-chlorostyrene, 2,4-dichlorostyrene, 2,5-dichlorostyrene, 2,6-dichlorostyrene, 4-chloro-2-methyl styrene, 4-chloro-3-fluorostyrene, and the like. In addition to at least one of these monomers, the copolymer must be formed from at least one polyfunctional monomer (as hereinafter defined). The copolymer is formed from about 95% to about 99.9% of at least one of the first monomers, more preferably from about 97% to about 99%, and most preferably about 98.5%, and from about 0.1% to about 5% of the polyfunctional monomer, more preferably from about 1% to about 3%, and most preferably about 1.5%.

"Polyfunctional monomers" as used herein are monomers having at least two functional groups where at least one functional group copolymerizes with the other monomers which are used to form either stage of the polymer and at least one other functional group remains after the polymerization for reacting with the same or similar functional group on other monomer units to crosslink the polymer. These polyfunctional monomers include, for example, amides or N-alkylolamides of α, β-ethylenically unsaturated carboxylic acids having 4–10 carbons, such as acrylamide, methacrylamide, N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkyl amides of the vinyl aromatic acids such as N-methylol-p-vinyl benzamide and the like. The preferred polyfunctional monomers of the N-alkylol amide type are the N-alkylol amides of the α, β-monoolefinically unsaturated monocarboxylic acids, such as N-methylol acrylamide and N-methylol methacrylamide. Other preferred polyfunctional monomer systems are mixtures of approximately equimolar mixtures of acrylamide and N-methylol acrylamide or of methacrylamide and N-methylol methacrylamide. The polyfunctional monomers impart self-curing characteristics to the compositions containing them. The cure may be enhanced by reaction with an active hydrogen containing resin added to formulations containing the two-stage monomer mixtures or resulting polymers, such as the triazine-formaldehyde and urea-formaldehyde resins. In either case, full cure occurs upon complete drying of the compositions on the textile materials treated therewith.

The high $T_g$ of the first stage imparts stiffness to the textile material when the binder is applied thereto and the resulting crosslinked character of this stage imparts chemical resistance, reduces thermoplasticity at elevated temperatures and binds the fibers of the textile material when the binder is applied thereto and heated.

The "second stage" of the latex binder is a copolymer which is stable in an acidic environment and is selected so as to coagulate in the presence of a counterion to the stabilizing surfactant of the emulsion and a nonionic surfactant upon heating within a narrow temperature range. In addition, the "second stage" copolymer may also contain a polyfunctional monomer. The weight of the "second stage" copolymer without the polyfunctional monomer, based on the total weight of this stage, is from about 95% to about 100%, more preferably from about 97% to about 99%, and most preferably about 98.5%. The weight of the polyfunctional monomer, based on the total weight of this stage, is from about 0% to about 5%, more preferably from about 1% to about 3%, and most preferably about 1.5%.

The weight of the first stage, based on the total weight of the latex particle comprising at least two mutually incompatible copolymers, is from about 1% to about 85%. It is preferred that the weight of this stage, based of the total weight of the latex particle, is from about 70% to about 80%. The weight of the second stage, based on the total weight of the latex particle comprising at least two mutually incompatible copolymers, is from about 15% to about 99%. It is preferred that the weight of the second stage, based of the total weight of the latex particle, is from about 20% to about 30%.

The latex polymers can be prepared by conventional emulsion polymerization techniques well known in the art, such as, for example, sequential emulsion polymerization processes as in U.S. Pat. Nos. 4,325,856, 4,654,397, and 4,814,373 which are hereby incorporated herein by reference.

Chain transfer agents such as, for example, mercaptans, polymercaptans and halogen compounds, are sometimes desirable in the polymerization mixture of either stage to moderate the molecular weight of the latex polymer. Generally, from about 0.1% to about 3%, by weight of the chain transfer agent, based on the weight of the total monomer mixture, may be used. The weight-average molecular weight of the first stage is from about 400,000 to about 2,000,000. The weight-average molecular weight of the second stage is also from about 400,000 to about 2,000,000.

The latex polymer particle size should be relatively small, between about 80 nanometers (nm) to about 225 nm, preferably from about 160 nm to about 190 nm. As is well-known, given the same polymer backbone, particle size is controlled primarily by the type and level of the emulsifier used in each stage of the sequential emulsion polymerization.

An anionic or cationic surfactant is employed during emulsion polymerization to emulsify the reactants and during subsequent storage to stabilize the emulsion, hereinafter referred to as the "stabilizing surfactant." A nonionic surfactant and a counterion to the stabilizing surfactant are post-added to the stabilized emulsion. For an anionically-stabilized emulsion, a multivalent metal salt, such as for example, magnesium sulfate, interferes with the stabilizing action of the anionic surfactant, but the nonionic surfactant continues to stabilize the emulsion. However, upon heating the mixture, through the cloud point of the post-added nonionic surfactant, but still not in excess of the $T_g$ of the binder, the latex emulsion is destabilized causing coagulation. Thus, a careful selection of surfactants, counterion to the stabilizing surfactant and temperature are made to insure that the latex binder will coagulate in a controlled manner. Anionic stabilization of the emulsion is preferred.

Suitable anionic stabilizing surfactants include, for example, the higher fatty alcohol sulfates, such as sodium lauryl sulfate, and the like; alkylaryl sulfonates such as sodium or potassium isopropylbenzene sulfonates or isopropyl naphththalene sulfonates, and the like; alkali metal higher alkyl sulfosuccinates, such as sodium octyl sulfosuccinate, sodium N-methyl-N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like. Suitable cationic stabilizing surfactants include, for example, alkylamine salts, quaternary ammonium salts, polyoxyethylene alkylamines and the like.

Suitable nonionic post-added surfactants include alkylphenoxypoly ethoxyethanols having alkyl groups of from about 7 to 18 carbons atoms and from about 6 to about 60 oxyethylene units, such as heptylphenoxypolyethoxyethanols, methyloctylphenoxypolyethoxy ethanols, and the like; polyethoxyethanol derivatives of methylene-linked alkyl phenol; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbons atoms; ethylene oxide derivatives of long-chained carboxylic acids, such as lauric acid, myristic acid, palmitic acid, oleic acid, and the like, or mixtures of acids such as those found in tall oil containing from 6 to 60 oxyethylene units per molecule; analogous ethylene condensates of long-chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; also, ethylene oxide sections combined with one or more hydrophobic propylene oxide sections. Mixtures of alkyl benzenesulfonates and ethoxylated alkylphenols may be employed.

Counterions to the stabilizing surfactant include multivalent metal ions if the emulsion is anionically-stabilized and halogens and other anions if the emulsion is cationically-stabilized.

Suitable multivalent metal ions such as calcium, magnesium, zinc, barium, strontium, and the like may be used in the coagulation process. Complexes of multivalent metal ions, such as zinc hexammonia and the like, and salts of multivalent metal ions with counterions, such as chloride, acetate, bicarbonate and the like, may be used. Magnesium sulfate is the preferred multivalent metal ion salt for binders used on battery separators. The specific type and level of multivalent metal ions used will depend upon the specified anionic surfactant and, in practice, is limited to those which do not have any adverse effect on battery performance or battery life.

Suitable anions such as chloride, acetate, bicarbonate, sulfate, phosphate and the like, may be used. The specific type and level of multivalent metal ions used will depend upon the specified anionic surfactant and, in practice, is limited to those which do not have any adverse effect on battery performance or battery life.

A preferred multi-stage emulsion polymer used in the present invention is a two-stage emulsion polymer stabilized with a suitable anionic surfactant, such as for example sodium lauryl sulfate, wherein a second stage is a copolymer of 98.5% by weight methyl methacrylate and 1.5% by weight methylol acrylamide which coagulates between 40° C.-50° C. when magnesium(II) multivalent metal ion and branched mono(octylphenyl) ether nonionic surfactant are added.

The two-stage latices of this invention may be applied to any textile to obtain a wide variety of useful articles. These two-stage latices are particularly well-suited for binders for use in applications which require a stiffened textile fiber at elevated temperature and higher relative humidity conditions and within an acid environment such as, for example, laminate structures used in the manufacture of printed circuit boards and battery separators.

The latex binder may contain additives useful for improving various properties of the textile materials such as, for example, colorants, surfactants, coalescents, wetting agents, drying retarders, antifoaming agents, preservatives, heat stabilizers, ultraviolet light stabilizers, and the like.

Techniques for applying the latex binder to the textile material include direct coating, transfer film application, lamination, saturation, spraying, and the like.

The following examples are intended to illustrate the invention; they are not intended to limit the invention as other applications of the invention will be obvious to those of ordinary skill in the art.

EXAMPLE 1

Preparation of Comparative Binders

Comparative Binders A, B, C are conventional, one-stage polymers which were prepared by a thermal gradual-addition emulsion polymerization process. The quantity of each ingredient which was added is shown in Table 1.1. A monomer emulsion was prepared by mixing the appropriate monomers with water and a 28% solution of sodium lauryl sulfate according to Table 1.1. Water and ammonium persulfate were charged to the reaction kettle and heated to 85° C. A catalyst cofeed was prepared and 80–90% of it was charged into the reaction kettle. A 4% portion of the monomer emulsion was added and immediately polymerized or a polymer seed was added. The remaining monomer emulsion and catalyst cofeed were separately fed into the reaction kettle over 3 hours, maintaining the temperature at 85° C. After the feeds were completed, the reaction kettle was held at 80°-85° C. for 30 minutes and then cooled to 60° C. A 0.1% solution of $FeSO_4.7H_2O$ was added. A mixture of t-butyl hydroperoxide, sodium sulfoxylate and water was then added and repeated two additional times. The reaction was cooled to room temperature and neutralized, if necessary, to a final pH of 6–7.5. The latex binder was then filtered through 100-mesh and 325-mesh screens. The compositions and final properties of the binders are shown in Table 1.2.

TABLE 1.1

| Sample Preparation | Comparative A | Comparative B | Comparative C |
|---|---|---|---|
| Kettle Charge | | | |
| Water (g): | 775 | 795 | 720 |
| APS (g): | 6.0 | 6.0 | 6.0 |
| Monomer Emulsion (ME) | | | |
| Water (g): | 767 | 767 | 735 |
| SLS (g): | 87.4 | 93.4 | 90.0 |
| MOA (g): | 55 | 57 | 54.9 |
| MMA (g): | 1625 | 1248 | — |
| IBOMA (g): | — | 425 | — |
| PMS (g): | — | — | 800.3 |
| VT (g): | — | — | 825 |
| Total monomer (g): | 1649.75 | 1698.65 | 1650.0 |
| g ME added to kettle: | 101 | 95 | — |
| g EA/MMA/MAA Polymer preform: (33 wt. % aqueous) | — | — | 90 |
| Catalyst Cofeed | | | |
| APS (g): | 1.1 | 1.1 | 1.1 |
| Ammonia [conc.] (g): | 2.6 | 2.6 | 2.6 |
| Water (g): | 156 | 156 | 156 |
| $FeSO_4.7H_2O$ [0.1%] (g): | 15 | 15 | 15 |
| Mixture (3× Additions) | | | |
| 70% t-Butyl Hydroperoxide (g): | 1.4 | 1.4 | 1.4 |
| Water (g): | 10 | 10 | 10 |
| Sodium Sulfoxylate Formaldehyde (g): | 0.7 | 0.7 | 0.7 |
| Water (g): | 19 | 19 | 20 |
| Neutralizer Mix 1 g Ammonia [conc.]/+ 19 g Water (g): | 3.0 | — | — |

NOTE:
APS: Ammonium Persulfate
SLS: Sodium Lauryl Sulfate (26 wt. % aqueous)
MOA: 1/1 Wt. % Methylolacrylamide/Acrylamide (45 wt. % aqueous)
MMA: Methyl Methacrylate
g: grams
IBOMA: Isobornyl Methacrylate
VT: 66% meta-Methyl styrene 33% PMS trace ortho-Methyl styrene
PMS: para-Methyl Styrene

TABLE 1.2

| Sample | % Total Solids | pH | Particle Size (nm) | Viscosity (cps) | Tg (°C.) |
| --- | --- | --- | --- | --- | --- |
| Comparative A | 46.4 | 7.0 | 160 | 30 | 118 |
| Comparative B | 47.0 | 6.8 | 144 | 170* | 132 |
| Comparative C | 46.4 | 6.8 | 121 | 138 | 114 |

NOTES:
Comparative A: 98.5 MMA/1.5 MOA
Comparative B: 73.5 MMA/25 IBOMA/1.5 MOA
Comparative C: 75 (65.2 MMA/33.3 PMS/1.5 MOA)//25 (98.5 MMA/1.5 MOA)
Particle Size measured via sedimentation field flow fractionation and thermal field flow fractionation.
Viscosity measured via Brookfield viscometer (#2 spindle at 60 rpm).
Tg measured via differential scanning calorimetry.
*#3 spindle.

EXAMPLE 2

Preparation of Two-Stage Binders

Binders 1, 2, 3, 4, 5 are two-stage polymers which were prepared by a conventional two-stage thermal gradual-addition emulsion polymerization process. The quantity of each ingredient which was added is shown in Table 2.1. To prepare stage I, monomer emulsion I was prepared by mixing the appropriate monomers with water and a 28% solution of sodium lauryl sulfate according to Table 2.1. Water and ammonium persulfate were charged to the reaction kettle and heated to 85° C. A catalyst cofeed was prepared and 80–90% of it was charged into the reaction kettle. A 4% portion of monomer emulsion I was added and immediately polymerized or a polymer seed was added. The remaining monomer emulsion I was fed into the reaction kettle over 1.5 hours, maintaining the temperature at 85° C. After completion of stage I, the reaction kettle was held at 80°–85° C. for 30 minutes. To prepare stage II, monomer emulsion II was prepared by mixing the appropriate monomers with water and a 28% solution of sodium lauryl sulfate according to Table 2.1. Monomer emulsion II was fed into the reaction kettle over 1.5 hours, maintaining the temperature at 85° C. The remaining catalyst cofeed was uniformly fed as a separate steam concurrently with the additions of monomer emulsions I and II. After the feeds were completed, the reaction kettle was held at 80°–85° C. for 30 minutes and then cooled to 60° C. A 0.1% solution of FeSO$_4$.7H$_2$O was added. A mixture of t-butyl hydroperoxide, sodium sulfoxylate and water was then added. In 15-minute intervals, two additional mixtures were added. The reaction was cooled to room temperature and neutralized, if necessary, to a final pH of 6–7.5. The latex binder was then filtered through 100-mesh and 325-mesh screens. The compositions and final properties of the binders are shown in Table 2.2.

TABLE 2.1

| Sample Preparation | Binder 1 | Binder 2 | Binder 3 | Binder 4 | Binder 5 |
| --- | --- | --- | --- | --- | --- |
| Kettle Charge | | | | | |
| Water (g): | 6.0 | 6.0 | 6.0 | 1.5 | 6.0 |
| Monomer Emulsion I (ME-1) | | | | | |
| Water (g): | 550 | 550 | 550 | 550 | 550 |
| SLS (g): | 67.5 | 67.5 | 67.5 | 67.5 | 67.5 |
| MOA (g): | 41.3 | 41.3 | 41.3 | 41.1 | 41.3 |
| MMA (g): | 806 | 600 | 806 | — | 806 |
| Styrene (g): | — | — | — | 600.2 | — |
| VT (g): | 413 | 619 | — | 618.8 | — |
| IBOMA (g): | — | — | 413 | — | — |
| PMS (g): | — | — | — | — | — |
| g ME-I added to kettle: | 95 | — | — | — | 95 |
| g EA/MMA/MAA Polymer Preform: (33 wt. % aqueous) | — | 90 | 90 | 90 | — |
| Monomer Emulsion II | | | | | |
| Water (g): | 220 | 220 | 220 | 220 | 550 |
| SLS [28%] (g): | 22.5 | 22.5 | 22.5 | 22.5 | 22.5 |
| MOA [45%] (g): | 14 | 14 | 14 | 13.8 | 14 |
| MMA (g): | 406 | 406 | 406 | 406 | 406 |
| Total Monomer (g) | 1650.0 | 1650.0 | 1650.0 | 1650.0 | 1650.0 |
| Catalyst Cofeed (3 hrs) | | | | | |
| APS (g): | 1.1 | 1.1 | 1.1 | n/a | 1.1 |
| Ammonia [conc.] (g): | 2.6 | 2.6 | 2.6 | n/a | 2.6 |
| Water (g): | 156 | 156 | 156 | n/a | 156 |
| Catalyst Cofeed #1 (10 minutes) | | | | | |
| APS (g): | | | | 4.5 | |
| Water (g): | | | | 60 | |
| Catalyst Cofeed #2 (100 minutes) | | | | | |
| APS (g): | | | | 1.1 | |
| Ammonia [conc.] (g): | | | | 2.6 | |
| Water (g): | | | | 146 | |
| FeSO$_4$.7H$_2$O [0.1%] (g): | 15 | 15 | 15 | 15 | 15 |
| Mixture (3× Additions) | | | | | |
| 70% t-Butyl Hydroperoxide (g): | 1.4 | 1.4 | 1.4 | 1.4 | 1.4 |
| Water (g): | 10 | 10 | 10 | 10 | 10 |
| Sodium Sulfoxylate Formaldehyde (g): | 0.7 | 0.7 | 0.7 | 0.7 | 0.7 |
| Water (g): | 19 | 19 | 19 | 19 | 19 |
| Neutralizer Mix 1 g Ammonia [conc.]/+ | — | 0.3 | — | — | — |

TABLE 2.1-continued

| Sample Preparation | Binder 1 | Binder 2 | Binder 3 | Binder 4 | Binder 5 |
|---|---|---|---|---|---|
| 19 g Water (g): | | | | | |

NOTE:
APS: Ammonium Persulfate
SLS: Sodium Lauryl Sulfate (26 wt. % aqueous)
MOA: 1/1 Wt. % Methylolacrylamide/Acrylamide (45 wt. % aqueous)
MMA: Methyl Methacrylate
g: grams
IBOMA: Isobornyl Methacrylate
VT: 66% meta-Methyl styrene 33% PMS trace ortho-Methyl styrene
PMS: para-Methyl Styrene

TABLE 2.2

| Sample | Composition | % Total Solids | pH | Particle Size (nm) | Viscosity (cps) | Tg (°C.) |
|---|---|---|---|---|---|---|
| Binder 1 | 75 (65.2 MMA/33.3 VT/1.5 MOA)//25 (98.5 MMA/1.5 MOA) | 46.6 | 6.6 | 127 | 130 | 118 |
| Binder 2 | 75 (48.5 MMA/50 VT/1.5 MOA)// 25 (98.5 MMA/1.5 MOA) | 46.1 | 7.4 | 203 | 20 | 99.5 |
| Binder 3 | 75 (65.2 MMA/33.3 IBOMA/1.5 MOA)//25 (98.5 MMA/12.5 MOA) | 46.1 | 6.6 | 203 | 19 | 131 |
| Binder 4 | 75 (48.5 St/50 VT/1.5 MOA)// 25 (98.5 MMA/1.5 MOA) | 46.5 | 6.7 | 107 | 50 | — |
| Binder 5 | 48.5 St/50 VT/1.5 MOA | 46.3 | 6.6 | 173 | 56 | — |

NOTES:
Particle Size measured via sedimentation field flow fractionation and thermal field flow fractionation.
Viscosity measured via Brookfield viscometer (#2 spindle at 60 rpm).
Tg measured via differential scanning calorimetry.

EXAMPLE 3

Preparation of Battery Separator

The battery separators were prepared for testing by applying the Comparative Binders A, B, C and Binders 1, 2, 3, 4, 5 (approximately 45% solids by weight) to a sheet of prebonded microglass fiberglass. The sheet was soaked in the binder until it was completely covered. Excess binder was removed by either passing it through low pressure nip rolls or by placing it between several layers of blotter paper and rolling gently with a 20-pound couch roll. The sheet was attached to a pin frame to prevent distortion upon heating. The sheet was then heated in a forced draft oven for 3–5 minutes at 200° C.

EXAMPLE 4

Acid Resistance Test

The battery separator components must be resistant to acid and other attacks by oxidative and reductive chemical reactions, conditions typical in a highly acidic, electrolytic, battery medium. The stability of the latex binder is determined by its ability to resist delamination from a fiberglass battery separator. The conditions of the test simulate those that the battery separator would encounter during the life of a lead-acid battery cell.

To prepare the sulfuric acid reagent, 800 ml of concentrated sulfuric acid was added to 3200 ml of water. The mixture was stirred, cooling to room temperature, and then adjusted to a specific gravity of 1.213. To prepare the oxidizing solution, 98 g of solid potassium dichromate was dissolved in 4,000 ml of the sulfuric acid reagent. NOTE: Extreme care, including using the proper protective equipment, was taken to store, handle and dispose of these dangerous reagents safely.

Each test specimen was prepared by cutting a section of the prepared battery separator of Example 3 2.75 inches long by 1.5 inches wide. A 0.25 inch hole was punched midway between the two ribs, approximately 0.375 inches from one end of the test specimen.

The oxidizing solution was added to a 2-liter boiling flask using 275 ml of solution per gram of test specimen. A reflux condenser was connected to the flask and the assembly was placed on a hot plate within a fume hood. The water flow was turned on to cool the condenser and then the hot plate was turned on. The solution was brought to a boil and the heat was adjusted to yield a reflux rate of 15–20 drops of condensed liquid per minute. The test specimen was first threaded onto a lead wire and then soaked in the cool test solution. The sample was placed carefully into the boiling flask and the condenser was reconnected. The contents of the flask were boiled for 5 hours at the 15–20 drop per minute reflux rate. After the 5 hour boil, the reflux condenser was disconnected and the flask was transferred to a waste sink where a water tube was inserted. The contents of the flask were rinsed with cool tap water until the overflow was cool and colorless.

Each test specimen was examined visually for blisters before draining the flask. The flask was then drained and the test specimen was carefully removed. Each test specimen was inspected visually for blisters and other signs of delamination. Each was also checked manually to determine if the latex binder could easily be peeled from the fibers of the battery separator. If the test specimen was free of blisters and other signs of delamination, it passed the test. If the specimen had blisters and other signs of delamination, including weak resistance to peeling, it failed the test. The results are shown in Table 4.1.

TABLE 4.1

Acid Resistance Test Results

| | |
|---|---|
| Comparative A | pass |
| Comparative B | pass |
| Comparative C | fail |
| Binder 1 | pass |
| Binder 2 | pass |
| Binder 3 | pass |
| Binder 4 | pass |
| Binder 5 | pass |

EXAMPLE 5

Stiffness Test

The stiffness of each battery separator was measured with a Teledyne ® Taber Stiffness Tester Model 150. The prepared battery separator was cut into pieces of 1.5 inches by 2.75 inches. The test specimen was inserted between the clamp jaws and equilibrated at 95° F. and 95% relative humidity for at least 10 minutes prior to testing. The stiffness was measured at 95° F. and 95% relative humidity on a scale of 0 to 100 with no weights added to the apparatus. Higher values indicate greater stiffness. A battery separator with a stiffness values less than 65 experience problems when it is inserted between the metal electrode plates during manufacture of battery cells. A battery separator with a stiffness value between 80 and 90 is preferred. The results are shown in Table 5.1.

TABLE 5.1

| Stiffness Test Results | |
| --- | --- |
| Comparative A | 62 |
| Comparative B | 79 |
| Comparative C | 86 |
| Binder 1 | 84 |
| Binder 2 | 83 |
| Binder 3 | 84 |
| Binder 4 | 73 |
| Binder 5 | 85 |

EXAMPLE 6

Coagulation Test

The coagulation test is used to determine the temperature at which the latex binder will coagulate.

To a 1000-ml beaker, the following ingredients were added and stirred for 5 minutes:

| | |
| --- | --- |
| Water | 386.0 g |
| Silane coupling agent | 0.38 g |
| Wetting agent (Aerosil ® MA-80) | 15.3 g |
| Nonionic surfactant (Triton ® CF-21) | 3.44 g |

Then 170 g of the latex binder (approximately 45 weight % solids) was added and stirred for an additional 5 minutes. This mixture is the "Latex Master Batch".

To a 400-ml beaker, the following ingredients were added and stirred for 5 minutes:

| | |
| --- | --- |
| Water | 12.8 g |
| Latex Master Batch | 191.6 g |
| Multivalent metal ion salt solution (2% by weight aqueous MgSO$_4$.7H$_2$O) | 95.6 g |

This final mixture is the "Formulated Latex Binder".

Into a 200-ml tall form beaker equipped with a thermometer (−1° C. to 512° C.) and a magnetic stirring bar, 100 ml of the formulated latex binder was dispensed. This apparatus was then placed into a 55° C. water bath equipped with a programmable hot plate/-stirrer with a stirring rate of 350 rpm. The Formulated Latex Binder was sampled every 1° C. from 40° C. to several degrees above the gelation point with a clean 50-ml pipet for each sampling. Each 50-ml sample was ejected on a separate spot of brown blotting paper (Brown James River Blotting Paper—Rockwell Barnes Company) marked with the corresponding temperature at which the sample was taken. After allowing the water to be absorbed into the paper for 2 minutes, the samples were examined for gelation. The gelation temperature was the temperature at which the first full spot of latex coagulum persisted on the surface of the brown blotting paper. The spot corresponding to the coagulation temperature was closer in appearance to all subsequent 1° C. interval spots than those made before gelation. The results are shown in Table 6.1. Temperatures above 50° C. are unacceptable to battery separator manufacturers.

TABLE 6.1

| Coagulation Test Results | |
| --- | --- |
| Comparative A | 44° C. |
| Comparative B | >50° C.; (47° C.**) |
| Comparative C | >50° C. |
| Binder 1 | 47° C. |
| Binder 2 | 46° C. |
| Binder 3 | 45° C. |
| Binder 4 | 39° C. |
| Binder 5 | 41° C. |

*Required three times the multivalent metal ion salt solution to force the coagulation at 47° C.

What is claimed is:

1. A composition comprising:
   (a) textile fibers,
   (b) a stabilizing ionic surfactant,
   (c) a counterion to the stabilizing surfactant,
   (d) a nonionic surfactant and
   (e) a multi-stage, water-insoluble polymer, wherein said polymer comprises a first stage copolymer and a second stage copolymer, where said first stage copolymer is formed from at least one hydrophobic monomer and at least one polyfunctional monomer, and where the first stage copolymer is acid-resistant and has a glass transition temperature greater than about 80° C. and where said second stage copolymer is acid-resistant and coagulable.

2. The composition of claim 1 wherein said stabilizing ionic surfactant is anionic and said second stage copolymer comprises methyl methacrylate and methylol acrylamide.

3. The composition of claim 1 wherein said stabilizing ionic surfactant is sodium lauryl sulfate.

4. A method for improving the stiffness of textile fibers comprising:
   (a) admixing a stabilizing ionic surfactant, a counterion to the stabilizing surfactant, a nonionic surfactant and a multi-stage, water-insoluble polymer, wherein said polymer comprises a first stage copolymer and a second stage copolymer, where said first stage copolymer is formed from at least one hydrophobic monomer and at least one polyfunctional monomer, and where the first stage copolymer is acid-resistant and has a glass transition temperature greater than about 80° C. and where said second stage copolymer is acid-resistant and coagulable;
   (b) depositing the admixture onto textile fibers; and
   (c) heating the textile fibers with the admixture deposited thereon, to a temperature above the cloud point of the nonionic surfactant and below the glass transition temperature of the first stage copolymer.

5. The method of claim 4 wherein said stabilizing ionic surfactant is anionic and said second stage copolymer comprises methyl methacrylate and methylol acrylamide.

6. The method of claim 4 wherein said stabilizing ionic surfactant is sodium lauryl sulfate.

* * * * *